(12) United States Patent
Hsu

(10) Patent No.: US 6,288,896 B1
(45) Date of Patent: Sep. 11, 2001

(54) HEAT DISSIPATION SYSTEM FOR A LAPTOP COMPUTER USING A HEAT PIPE

(75) Inventor: Richard T. Hsu, Milpitas, CA (US)

(73) Assignee: Acer Incorporated, Taipei (TW)

( * ) Notice: Subject to any disclaimer, the term of this patent is extended or adjusted under 35 U.S.C. 154(b) by 0 days.

(21) Appl. No.: 09/109,537

(22) Filed: Jul. 2, 1998

(51) Int. Cl.[7] ................................ G06F 1/20; H05K 7/20
(52) U.S. Cl. ................ 361/687; 361/700; 165/104.33; 174/15.2
(58) Field of Search ............................... 361/687, 699, 361/700, 704, 707; 165/104.33, 104.21, 86, 185; 174/15.2

(56) References Cited

U.S. PATENT DOCUMENTS

| 5,313,362 | * | 5/1994 | Hatada et al. | 361/709 |
|---|---|---|---|---|
| 5,383,340 | | 1/1995 | Larson et al. | 62/259.2 |
| 5,513,070 | | 4/1996 | Xie et al. | 361/700 |
| 5,598,320 | | 1/1997 | Toedtman et al. | 361/687 |
| 5,621,613 | | 4/1997 | Haley et al. | 361/687 |
| 5,634,351 | | 6/1997 | Larson et al. | 62/259.2 |
| 5,646,822 | | 7/1997 | Bhatia et al. | 361/687 |
| 5,647,429 | | 7/1997 | Oktay et al. | 165/104.26 |
| 5,718,282 | | 2/1998 | Bhatia et al. | 165/86 |
| 5,781,409 | * | 7/1998 | Mecredy, III | 361/687 |
| 5,796,581 | * | 8/1998 | Mok | 361/687 |
| 5,822,187 | * | 10/1998 | Garner et al. | 361/687 |
| 5,832,987 | * | 11/1998 | Lowry et al. | 165/86 |
| 5,910,883 | * | 6/1999 | Cipolla et al. | 361/687 |
| 5,933,323 | * | 8/1999 | Bhatia et al. | 361/700 |

* cited by examiner

Primary Examiner—Lynn D. Feild
(74) Attorney, Agent, or Firm—Towsend and Townsend and Crew, LLP

(57) ABSTRACT

The present invention provides heat dissipation systems for use in hinged computing devices which includes a thermally conductive joint (36). The joint has first and second receptacles (104, 108) which are generally parallel to and adjacent one another. A first heat pipe (22) is at least partially disposed within the first receptacle and is adapted to be thermally coupled to a heat source within the hinged computing device. A second heat pipe (30) is at least partially disposed within the second receptacle and is adapted to be thermally coupled to a heat sink. The thermally conductive joint permits the transfer of heat from the first heat pipe to the second heat pipe to transfer heat from the heat source to the heat sink portion of the hinged computing device.

31 Claims, 7 Drawing Sheets

HEAT DISSIPATION SYSTEM FOR A LAPTOP COMPUTER USING A HEAT PIPE

BACKGROUND OF THE INVENTION

The present invention is directed to a heat dissipation apparatus for portable electronic devices, and more specifically, to a heat dissipation apparatus using heat pipes for a laptop computer.

Increasingly complex integrated circuits for use with computers, and more specifically, with laptop or portable computers, have resulted in numerous known advantages. However, these advantages are not without their corresponding drawbacks, namely, the generation of more heat than computers using less complex integrated circuits. Cooling of heat-producing components within a laptop computer can be critical to avoid excessive amounts of heat buildup which can adversely affect the performance of a microprocessor chip and other electronic components. Several systems are available to attempt to cool the electronic components of a portable computer.

For example, an electric fan placed near heat-generating components can blow hot air away from such components. However there are some drawbacks to using the electric fan. First, the necessity for moving parts in these electric fans makes them susceptible to breakage. Second, the electric fans generate a significant amount of noise. Third, the use of electric fans in portable battery-powered computers, where maximum battery life is desirable, is a drawback since providing power to the electric fan reduces the battery life of the computer. Fourth, the relatively large size of a typical electric fan requires a large amount of space inside the portable computer, where space is at a premium. Fifth, circulation of air into the electric fan also pulls in dust and debris. For at least the foregoing reasons, it would be desirable to provide sufficient heat dissipation away from heat-generating electronic components without the need to use an electric fan.

Another heat dissipation device involves the use of a heat sink. Essentially, the heat sink is placed in thermal communication with the processor or other heat-generating components to transfer heat away from such components into the heat sink. The transferred heat is then dissipated through the surface area of the heat sink, thereby reducing the amount of heat buildup in the electronic components. However, there are some drawbacks to using only heat sinks, especially in portable computers that implement processors which generate a significant amount of heat. First, if a significant amount of heat is generated, then a larger-sized heat sink is necessary to adequately dissipate the amount of heat. Second, larger-sized heat sinks tend to weigh more and take up more space.

A third and relatively new method of dissipating heat from a processor involves the use of a heat pipe. Heat pipes operate by placing an evaporation portion of the heat pipe in thermal communication with a heat-generating electronic component. The second end or condensation portion of the heat pipe is positioned away from the heat-generating component. The heat pipe typically contains a fluid that flows along a wick attached to the inner surface of the pipe. Heat from a heat-generating electronic component vaporizes the fluid which creates a pressure differential between the end of the heat pipe thermally coupled to the heat source and the remote end of the heat pipe. The pressure differential pumps the fluid through the wick from the condensation portion to the evaporation portion. The vaporized fluid is then pumped from the evaporation portion to the condensation portion of the heat pipe. Heat pipes have the potential of rapidly transferring heat away from a microprocessor chip or other heat-generating component. Hence, the use of heat pipes will be desirable in situations when the use of an electric fan or a large heat sink are undesirable.

It is desirable to integrate the use of heat pipes in portable computers in a manner which can be easily manufactured and yet provide reliable and sturdy support for the heat pipe to avoid crimping or other damage thereto. It is further desirable to transfer the heat from the heat-generating components to a large, remote heat sink where the heat will not damage electronic components.

SUMMARY OF THE INVENTION

The present invention provides exemplary heat dissipation systems, and portable electronic devices using such systems, to efficiently dissipate heat from heat-generating electronic components. More specifically, the present invention involves heat dissipation systems which include heat pipes to transfer heat from a processor or other electronic components, through a specialized joint and into the lid assembly of the portable computer. The present invention further provides sufficient electromagnetic interference (EMI) shielding of the processor in order to mitigate against the likelihood of transmitting EMI throughout the computer by way of the heat pipe.

The present invention provides a heat dissipation system for use in a hinged computing device which includes a thermally conductive joint or coupling element. The joint has first and second receptacles or bores which are generally parallel to and adjacent one another. The heat dissipation system includes first and second heat pipes, each having first and second ends. The first end of the first heat pipe is at least partially disposed within the first receptacle and the second end is adapted to be thermally coupled to a heat source within the hinged computing device, such as a processor, a micro processor module, or the like. It will be appreciated by those skilled in the art, that the heat source can be a wide range of heat-generating electronic components within the scope of the present invention. The first end of the second heat pipe is at least partially disposed within the second receptacle and the second end is adapted to be thermally coupled to a heat sink portion of the hinged computing device. In this manner, the thermally conductive joint permits the transfer of heat from the first heat pipe to the second heat pipe. The second heat pipe, in turn, transfers heat to the heat sink portion of the hinged computing device.

Preferably, the thermally conductive joint includes copper. However, other thermally conductive materials, including other metals, may be used within the scope of the present invention. The joint preferably comprises first and second portions connected to one another. The first portion includes the first receptacle and the second portion includes the second receptacle. In this manner, the joint can be manufactured in two pieces and later assembled along with the heat pipes as part of a heat dissipation system. Alternatively, the joint comprises either a single piece, or more than two pieces operably connected together.

In one aspect, the first heat pipe has first and second portions. The first portion is generally round and at least partially disposed within the first receptacle, and the second portion is generally flat. In this manner, the generally round portion can be readily rotated within the first receptacle and the generally flat portion can be positioned within the tight confines of a portable laptop computer to be thermally coupled to the heat source. Similarly, the second heat pipe preferably includes a first portion that is generally round and at least partially disposed within the second receptacle, and a second portion that is generally flat.

In another aspect, the heat dissipation system further includes a heat spreader that is operably attached to the first heat pipe and is adapted to be thermally coupled to, and at least partially enclose the heat source. In one aspect, the heat spreader further includes at least one thermally conductive pad adapted to be thermally coupled to the heat source. In this manner, the thermally conductive pad may be in contact with a heat source to assist the transfer of heat from the heat source to the first heat pipe. In one particular aspect, the heat spreader includes an EMI shield. In this manner, the heat spreader helps reduce the likelihood that the first heat pipe will transfer EMI throughout the laptop computer.

In still another aspect of the heat dissipation system, the system further includes a thermally conductive chassis. Preferably, the thermally conductive joint is operably attached to the chassis. Alternatively, the chassis is integrally formed with at least a portion of the joint. In this manner, the thermally conductive joint facilitates the transfer of heat between the first and second heat pipes, and also, facilitates the transfer of heat from the joint to the chassis. In one aspect, at least a portion of the first heat pipe also is thermally coupled to the chassis. The heat spreader preferably is thermally coupled to the chassis so that heat is conducted from the heat spreader to the chassis. In one particular aspect, the chassis comprises an electrical ground. In this manner, the heat pipe is grounded to the chassis to help avoid the transfer of EMI throughout the computer. Further, the heat spreader preferably is electrically grounded to the chassis.

In still another aspect, the chassis preferably includes a metal, and more preferably, an aluminum-magnesium alloy. However, other thermally conductive materials, including other metals, may be used within the scope of the present invention. To further facilitate heat dissipation, the chassis in one aspect includes a plurality of radiator fins. Radiator fins may comprise aluminum, aluminum-magnesium or other thermally conductive materials.

In one aspect, the heat sink portion includes a thermally conductive panel, preferably an aluminum-magnesium alloy panel. Such a heat sink operates to radiate heat to the surrounding environment. In one aspect, the panel includes a plurality of radiator fins to further facilitate heat dissipation. In one particular aspect, the panel is integrally formed with at least a portion of the joint. In this manner, the integration of the joint with the thermally conductive chassis and/or panel further encourages the transfer of heat from the joint to these large radiator surfaces. Alternatively, the joint is operably attached to the panel.

In still another aspect, the heat dissipation system further includes a third heat pipe having first and second ends. The first end is at least partially disposed within the second receptacle and the second end is adapted to be thermally coupled to the heat sink portion of the hinged computing device. In this manner, both the second and third heat pipes transfer heat from the joint to the heat sink portion.

The present invention further provides hinged computing devices, such as laptop computers, having a heat dissipation system as previously described. Hinged computers include a base comprising a processor, and a lid assembly hingedly connected to the base. The base includes the first heat pipe and the lid assembly includes the second heat pipe of the heat dissipation system.

In one aspect, the lid assembly further includes a display, preferably a liquid crystal display. In one particular aspect, at least a portion of the display is proximate the second heat pipe. In this manner, at least some of the heat conducted through the second heat pipe is conducted to the display.

The base and lid assembly are hingedly connected along a hinge axis. In one aspect, a portion of the second heat pipe is aligned with the hinge axis. In this manner, an end of the second heat pipe is adapted to rotate within the joint when the lid is opened or closed. Alternatively, a portion of the first heat pipe is aligned with the hinge axis and an end of the first heat pipe is adapted to rotate within the joint when the lid assembly and base are rotated relative to each other about the hinge axis. In this manner, when the lid is opened or closed, an end of a heat pipe rotates within the joint. Such rotation helps avoid crimping or damage to the heat pipes.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 2:
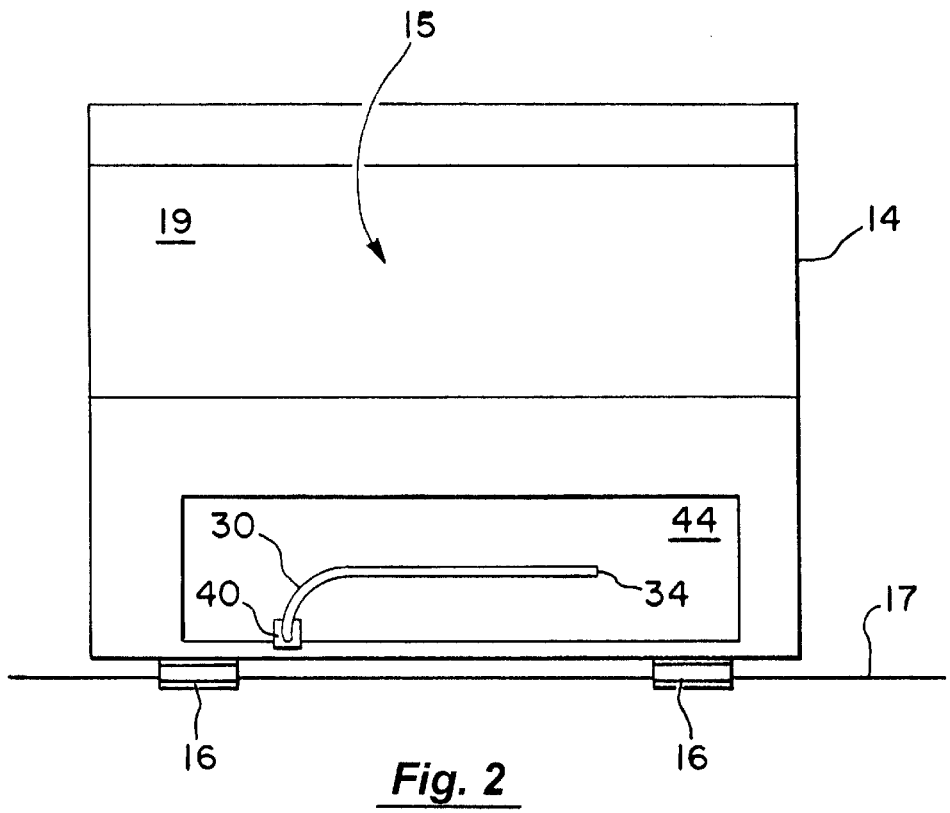
FIG. 2 depicts a back side of the lid assembly of the hinged computing device depicted in FIG. 1.
Figure 1:
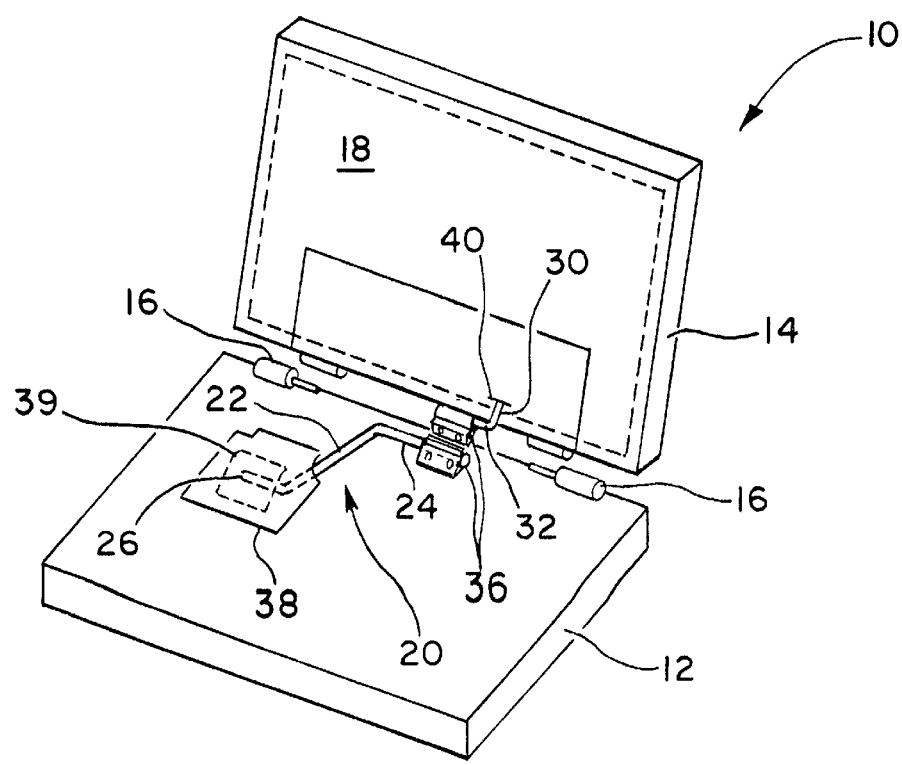
FIG. 1 depicts an overall view of a hinged computing device incorporating a heat dissipation system according to the present invention.

FIGS. 1 and 2 depict a hinged computer 10 according to the present invention. Hinged computer 10 includes a base 12 and a lid assembly 14. FIG. 2 depicts a back (or outer) side 15 of lid assembly 14. Two hinges 16 operate to hingedly connect base 12 and lid assembly 14. Hinges 16 rotate along a hinge axis 17 as shown in FIG. 2. Lid assembly 14 includes a display 18, preferably a liquid crystal display 18, and a thermally conductive panel 19. Hinged computer 10 further includes a heat dissipation system 20. Heat dissipation system 20 includes a first heat pipe 22 having a first end 24 and a second end 26, and a second heat pipe 30 having a first end 32 and a second end 34. First ends 24 and 32 are thermally coupled to a thermally conductive coupling element or joint 36, which is adapted to permit lid assembly 14 to be opened and closed without damaging either first or second heat pipes 22, 30. First and second heat pipes 22 and 30 may comprise a wide range of materials within the scope of the present invention, including copper or the like.

Heat dissipation system 20 further includes a heat spreader 38. Heat spreader 38 is positioned over a heat generating component, such as a processor 39, located in base 12. Heat-generating components also may include a high speed DRAM, SRAM, or the like. Second heat pipe 30 passes through an opening 40 in panel 19 to back side 15 of lid assembly 14, as best shown in FIG. 2. Second heat pipe 30 resides in a recessed area 44 within lid assembly 14. More preferably, second heat pipe 30 resides in a recessed area 44 within panel 19.

Figure 3:
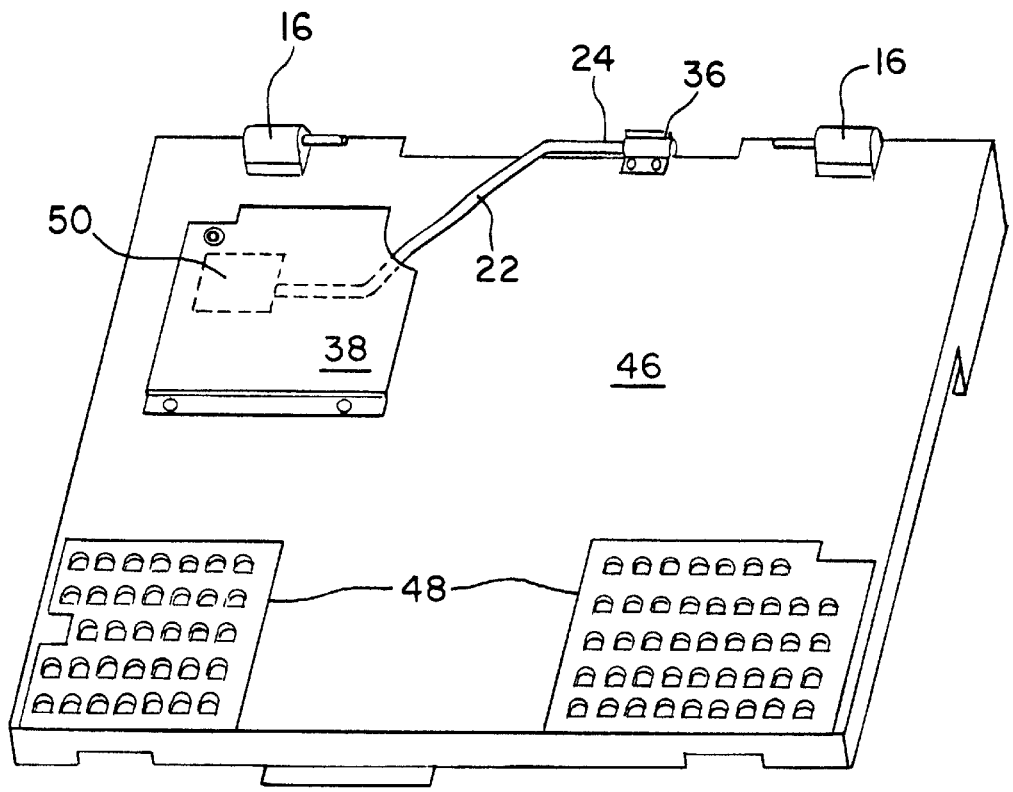
FIG. 3 depicts an overall view of a chassis and first heat pipe as part of a heat dissipation system according to the present invention.

As shown in FIG. 3, heat dissipation system 20 further includes a chassis 46 located within base 12. Chassis 46 preferably provides an electrical ground and preferably further includes a plurality of radiator fins 48. Fins 48 facilitate the dissipation of heat transferred to chassis 46 by heat-generating components, such as processor 39 (not shown). Fins 48 provide a greater surface area for heat dissipation, and are capable of absorbing and dissipating at least about 2 to 3 watts. Heat spreader 38 preferably is thermally coupled to chassis 46 to facilitate the transfer of heat to chassis 46. Heat spreader 38 further is preferably grounded to chassis 46. Heat spreader 38 may include copper, aluminum or the like. It will be appreciated by those skilled in the art that heat spreader 38 may comprise other materials within the scope of the present invention.

Heat spreader 38 preferably includes at least one pad 50 located on the underside of heat spreader 38. Pad 50 is adapted to be thermally coupled to a heat-generating component, such as processor 39. Pad 50 preferably comprises thermally conductive material, such as a thermally conductive elastomer or the like, and can be positioned in contact with processor 39 without damaging the processor.

In conjunction with FIGS. 1–3, the operation of heat dissipation system 20 within hinged computer 10 will be described. A heat-generating electrical component, such as processor 39, is located under heat spreader 38. Heat generated by such an electronic component can build up within base 12 to a level which potentially may damage sensitive electronic components, including processor 39. To help dissipate such heat, first heat pipe 22 is thermally coupled to the heat generating component. Second end 26 of first heat pipe 22 preferably is located under heat spreader 38 and is in contact with pad 50, which is in contact with the heat generating component. Alternatively, second end 26 may be on top of heat spreader 38, provided it is thermally coupled to the heat generating component.

Heat from the electronic component passes into pad 50 and, in turn, into first heat pipe 22. First heat pipe 22 encourages the transfer of heat away from the heat-generating component by using standard heat pipe technology. Fluids within heat pipes 22 and 30 may comprise water, refrigerants in general, fluorocarbons, alcohols such as methyl alcohol ($CH_3OH$), ethyl alcohol ($C_2H_5OH$), and the like. First heat pipe 22 operates to transfer heat from its second end 26 to its first end 24. Heat passes through thermally conductive joint 36 into first end 32 of second heat pipe 30. Joint 36 preferably positions first ends 24 and 32 so that they are adjacent and generally parallel to each other to facilitate the transfer of heat therebetween. Heat pipe 30 passes through opening 40 and permits the transfer of heat toward second end 34 of heat pipe 30. Panel 19 of lid assembly 14 comprises thermally conductive material, and preferably comprises an aluminum-magnesium alloy. Such a material facilitates the conduction of heat from heat pipe 30 throughout panel 19. Panel 19 is exposed to the surrounding environment, thereby encouraging the radiation of heat away from lid assembly 14. Further, by passing second heat pipe 30 through opening 40 in panel 19, second heat pipe 30 also is exposed to the surrounding environment. In the manner described, heat produced by the electronic components in base 12 is passed through joint 36 to panel 19 by heat pipes 22 and 30 and dissipated to the surrounding environment.

To further facilitate the dissipation of heat, chassis 46 located within base 12 operates as a heat sink. Chassis 46 preferably comprises a thermally conductive metal, and more preferably, an aluminum-magnesium alloy. Typically, heat-generating components are thermally coupled to chassis 46 to allow at least some heat generated by those components to be transferred to chassis 46. The present invention further provides that first heat pipe 22 preferably is at least partially thermally coupled to chassis 46 to further encourage the transfer of heat to chassis 46. More preferably, heat pipe 22 is thermally coupled to chassis 46 in a region located close to joint 36. Joint 36 also is preferably thermally coupled to chassis 46 by mounting joint 36 thereon. This arrangement facilitates the conduction of heat from joint 36 to chassis 46. Alternatively, joint 36 is coupled to lid assembly 14, and more specifically, to panel 19. Heat spreader also preferably transfers some heat to chassis 46.

In addition to assisting the transfer of heat from heat-generating components to heat pipe 22, and also preferably to chassis 46, heat spreader 38 acts as an EMI shield. The operation of high speed electronic components produces electromagnetic energy which, if transferred throughout the remaining electronic components within base 12, can cause interference therewith. Spreader 38 operates as an EMI shield to help prevent the transfer of electromagnetic interference from a region located close to the EMI-generating component. Without heat spreader 38 grounded to chassis 46, heat pipe 22 has the potential to act as a floating antenna, which would contribute to the distribution of EMI throughout base 12, thereby causing possible degradation of computer 10 performance.

Figure 4:
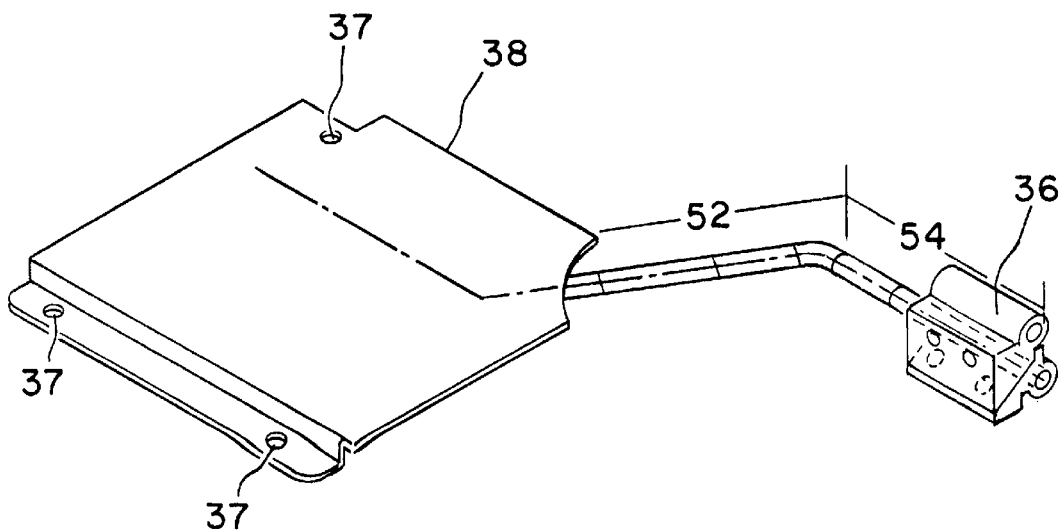
FIG. 4 depicts an overall view of a heat spreader, a first heat pipe and a thermally conductive joint according to the present invention.

FIG. 4 shows a specific embodiment where heat pipe 22 has a generally flat portion 52 and a generally round portion 54. The generally flat portion 52 of first heat pipe 22 is thermally coupled to the heat-generating component within base 12. The generally round portion 54 of first heat pipe 22 is thermally coupled to joint 36. As shown in FIG. 4, generally round portion 54 is located within joint 36 and generally flat portion 52 is located adjacent and under heat spreader 38. Round portion 54 is adapted to rotate within joint 36. Flat portion 52 is adapted to fit within tight confines of a laptop computer. Alternatively, portion 52 also may be round within the scope of the present invention.

Similarly, second heat pipe 30 has generally flat and generally round portions. The generally flat portion of heat pipe 30 is thermally coupled to panel 19 and the generally round portion of heat pipe 30 is thermally coupled to joint 36. Heat spreader 38 may be screwed, bolted, or otherwise operably attached to chassis 46 in order to thermally couple heat spreader 38 to chassis 46. In one embodiment, heat spreader 38 includes at least one screw hole 37 to permit the attachment of heat spreader 38 to chassis 46.

Figure 5A:
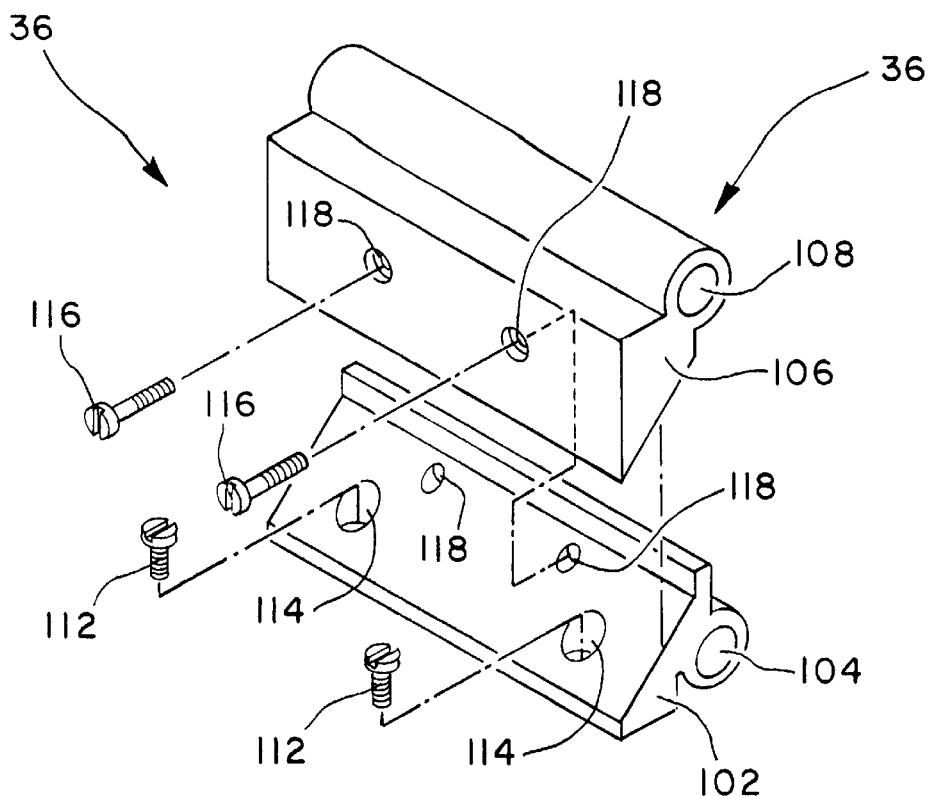
FIG. 5A depicts an exploded view of a thermally conductive joint according to the present invention.
Figure 5B:
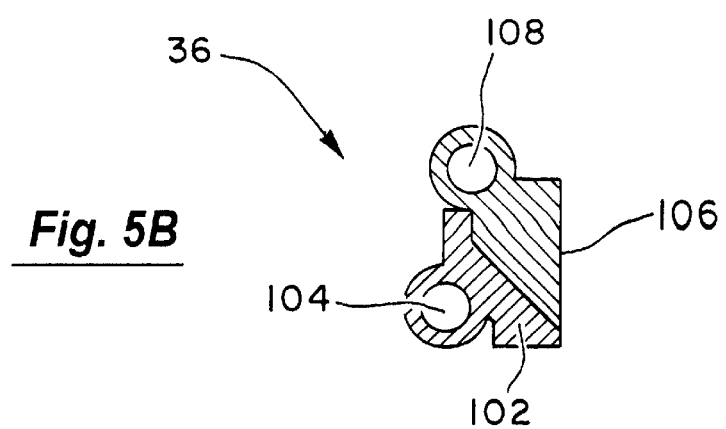
FIG. 5B depicts a side cross-sectional view of the thermally conductive joint depicted in FIG. 5A.

FIGS. 5A–B show additional details of thermally conductive joint 36 according to a specific embodiment of the present invention. Joint 36 includes a first portion 102 having a first receptacle 104 and a second portion 106 having a second receptacle 108. First and second receptacles 104, 108 are positioned generally parallel to and adjacent one another. First end 24 of first heat pipe 22 is inserted into first receptacle 104 and first end 32 of second heat pipe 30 is inserted into second receptacle 108. As a result, first ends 24, 32 also are adjacent and generally parallel to each other. In this manner, first ends 24, 32 of heat pipes 22, 30 are thermally coupled through joint 36.

Joint 36 preferably comprises copper; however, other thermally conductive materials including other thermally conductive metals are possible within the scope of the present invention. Joint 36 is shown having cylindrical-shaped receptacles 104 and 108, however, other receptacle shapes are possible within the scope of the present invention. Further, receptacles 104 and 108 may be formed with a longitudinal opening or slit. Sleeves or casings may then fit over the receptacle to help contain heat pipe ends in receptacles 104, 108. Receptacles 104, 108 also may include thermally conductive lubricant therein to facilitate movement of heat pipes within their respective receptacles. Receptacles 104, 108 are shown extending the full length of first portion 102 and second portion 106, respectively. Alternatively, receptacles 104, 108 extend part way along the length of first portion 102 and second portion 106. Receptacles 104 and 108 further may have one end closed and one end opened to receive a heat pipe end.

Joint 36 comprises first and second portions 102, 106, in part to permit ease of manufacture of joint 36. More specifically, lid assembly 14 can be constructed with second heat pipe 30, and base 12 may be constructed with first heat pipe 22. First portion 102 of joint 36 can be placed on first end 24 of heat pipe 22 by inserting end 24 into receptacle 104. Second portion 106 of joint 36 can be placed on first end 32 of heat pipe 30 by inserting end 32 into receptacle 108. In this manner, lid assembly 14 and base 12 may be constructed separate from one another, and integrated together. First portion 102 preferably is attached to chassis 46 using screws or fasteners 112 disposed within holes 114. The use of thermally conductive materials for joint 36 facilitates the transfer of heat from joint 36 to chassis 46, to further enhance the heat dissipation ability of the present invention. First and second portions 102, 106 are operably attached together using screws or fasteners 116 fitted within holes 118 in first and second portions 102 and 106.

Joint 36 is positioned to align either receptacle 104 or receptacle 108 along hinge axis 17. In this manner, one of the heat pipes 22, 30 rotates within its respective receptacle 104, 108 as lid assembly 14 is opened or closed. Preferably, joint 36 is operably attached to chassis 46 to align receptacle 108 along hinge axis 17. In this manner, first end 32 of second heat pipe 30 rotates within receptacle 108 as lid assembly 14 is opened or closed. Joint 36 is designed to have a long wear life, namely, joint 36 has a life at least as long as hinges 16. Further, hinges 16 provide a majority of the structural stability between base 12 and lid assembly 14. Joint 36 primarily operates to thermally couple first and second heat pipes 22, 30.

It will be appreciated by those skilled in the art that joint 36 need not have first and second receptacles 104, 108 generally parallel to each other to provide for heat transfer. Provided one of the receptacles 104, 108 is aligned with hinge axis 17, the other receptacle 104, 108 need not be generally parallel to hinge axis 17. Further, joint 36 may have only a single receptacle, with one heat pipe, aligned with hinge axis 17 and a means to thermally couple another heat pipe to joint 36. For example, first end 32 of second heat pipe 30 may be aligned with hinge axis 17 to permit end 32 rotation within receptacle 108. First end 24 of first heat pipe 22 then can be thermally coupled with joint 36, with or without a receptacle, to permit heat transfer between first end 24 and first end 32.

Figure 6A:
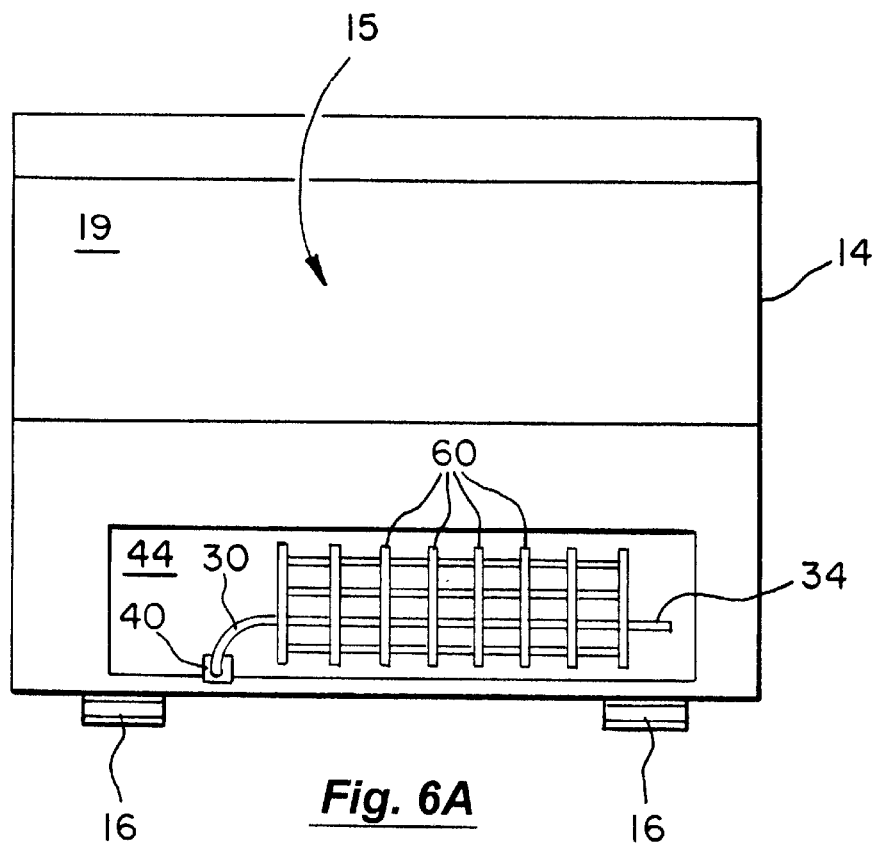
FIGS. 6A and 6C depict a plan back view and a perspective view, respectively, of lid assemblies according to the present invention.
Figure 6B:
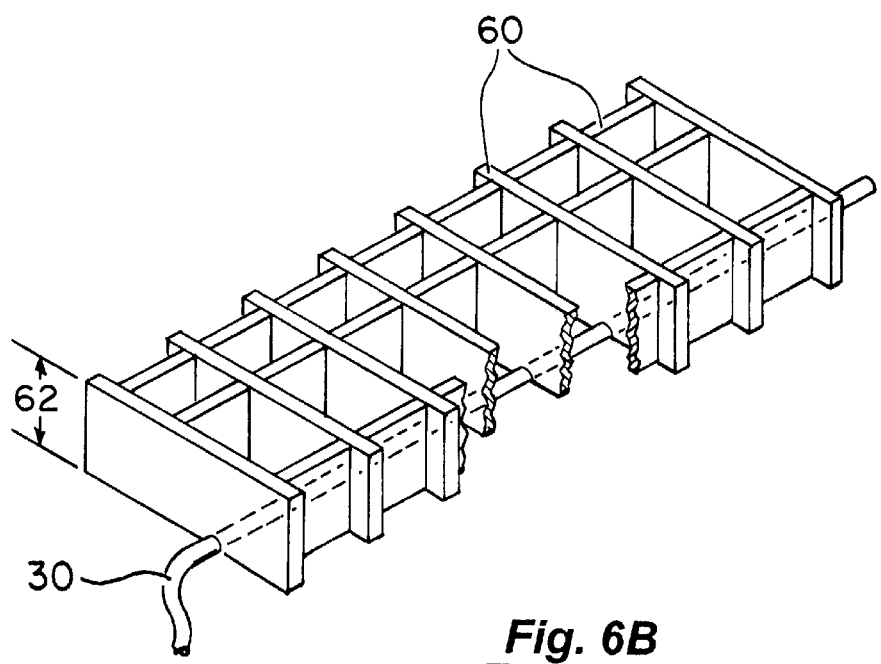
FIG. 6B is an isometric view of the panel radiator fins depicted in FIG. 6A.
Figure 6C:
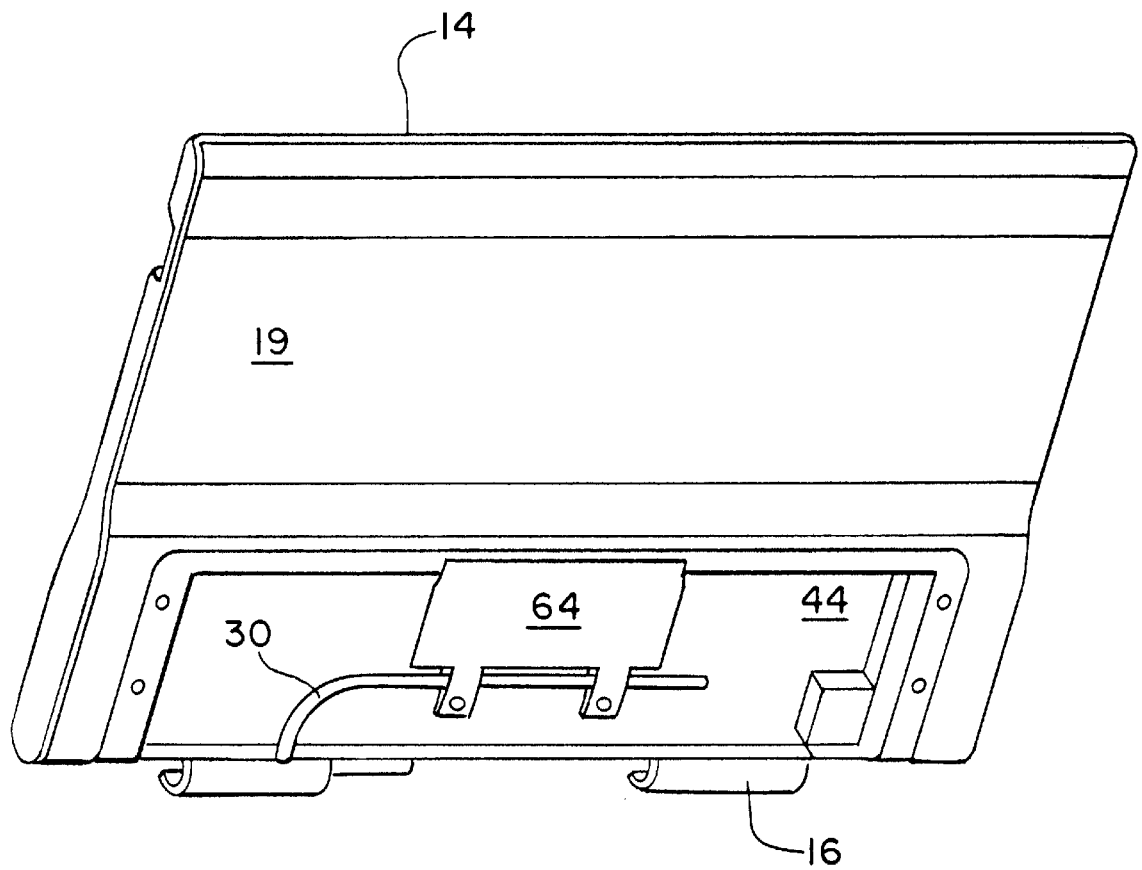

Turning now to FIGS. 6A–6C, another embodiment of lid assembly 14 according to the present invention will be described. FIG. 6A and 6C depict back side 15 of lid assembly 14, including second heat pipe 30 passing through opening 40 in panel 19. Second heat pipe 30 is thermally coupled to a plurality of panel radiator fins 60 (not shown in FIG. 6C). Fins 60, positioned within recessed area 44 in panel 19, receive heat from second heat pipe 30 and dissipate that heat to the surrounding environment. Fins 60 provide an increased surface area that is exposed to the surrounding environment than in the embodiment depicted in FIGS. 1–3 having only panel 19. Fins 60 may include a variety of thermally conductive materials, including, aluminum, aluminum-magnesium alloy, and the like. The number and layout of fins 60 can vary within the scope of the present invention from that shown in FIGS. 6A and 6B.

As best shown in FIG. 6B, fins 60 have a height 62 that permit fins 60 to fit within recessed area 44. In one embodiment, height 62 is about 10 millimeters. Different fin heights 62 are possible within the scope of the present invention. Typically, recessed area 44 is covered with a cover (not shown) made of plastic, metal such as a metal grid, or the like. Such materials facilitate the dissipation of heat from second heat pipe 30, panel 19 and fins 60, while preventing these components from contacting something or someone sensitive to such heat. FIG. 6C further depicts a bracket 64, which in one embodiment is used to operably attach second heat pipe 30 in place.

Figure 7A:
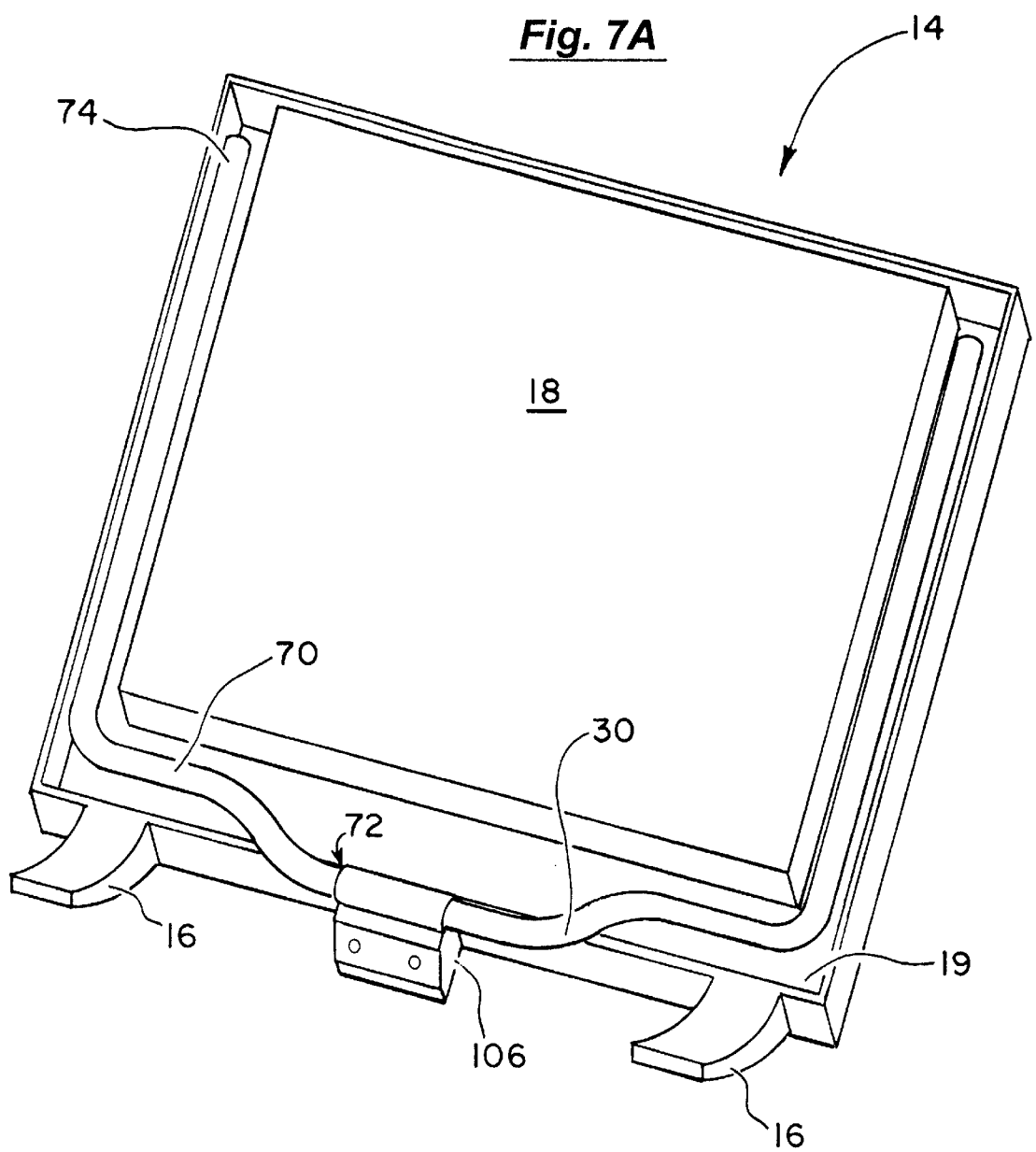
FIGS. 7A–7B depict an isometric view and a side cross-sectional view of an alternative embodiment of a portion of the heat dissipation system.
Figure 7B:
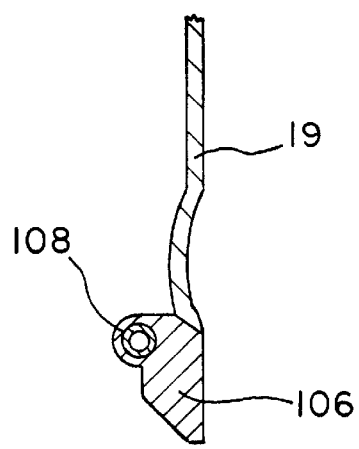

FIGS. 7A and 7B depict an alternative embodiment of the present invention. As shown in FIG. 7A, lid assembly 14 includes a third heat pipe 70 having a first end 72 and a second end 74. First end 72 is disposed within joint 36, and more specifically, is disposed within second receptacle 108. In this embodiment, receptacle 108 is open at both of its ends to permit second heat pipe 30 first end 22 and third heat pipe 70 first end 72 to be simultaneously disposed therein. Second and third heat pipes 30, 70 are positioned within lid assembly 14 along side of display 18.

FIG. 7B depicts an alternative embodiment of panel 19 and joint 36. In this embodiment, joint 36 preferably comprises two pieces, first portion 102 and second portion 106 as shown in FIGS. 5A–5B, which are operably attached together to form joint 36. Second portion 106 is integrally formed with panel 19. In this arrangement, second portion 106 of joint 36 may comprise insert molded copper floated within an aluminum-magnesium alloy panel 19. Such an integrally formed combination helps facilitate the transfer of heat from heat pipes 30 and 70 to panel 19. Similarly, first portion 102 can be integrally formed with chassis 46 (not shown in FIG. 7). In this manner, base 12 and lid assembly 14 are held together by hinges 16. First and second portion 102, 106 are operably attached together to form joint 36. The molding or other manufacturing process used to form the integrally formed combinations of chassis 46/first portion 102 and panel 19/second portion 106 are designed to align one of the portions 102, 106 with hinge axis 17. More specifically, one of the receptacles 104, 108 is aligned with hinge axis 17 to permit rotation of the end of the heat pipe disposed within that receptacle.

Figure 8:
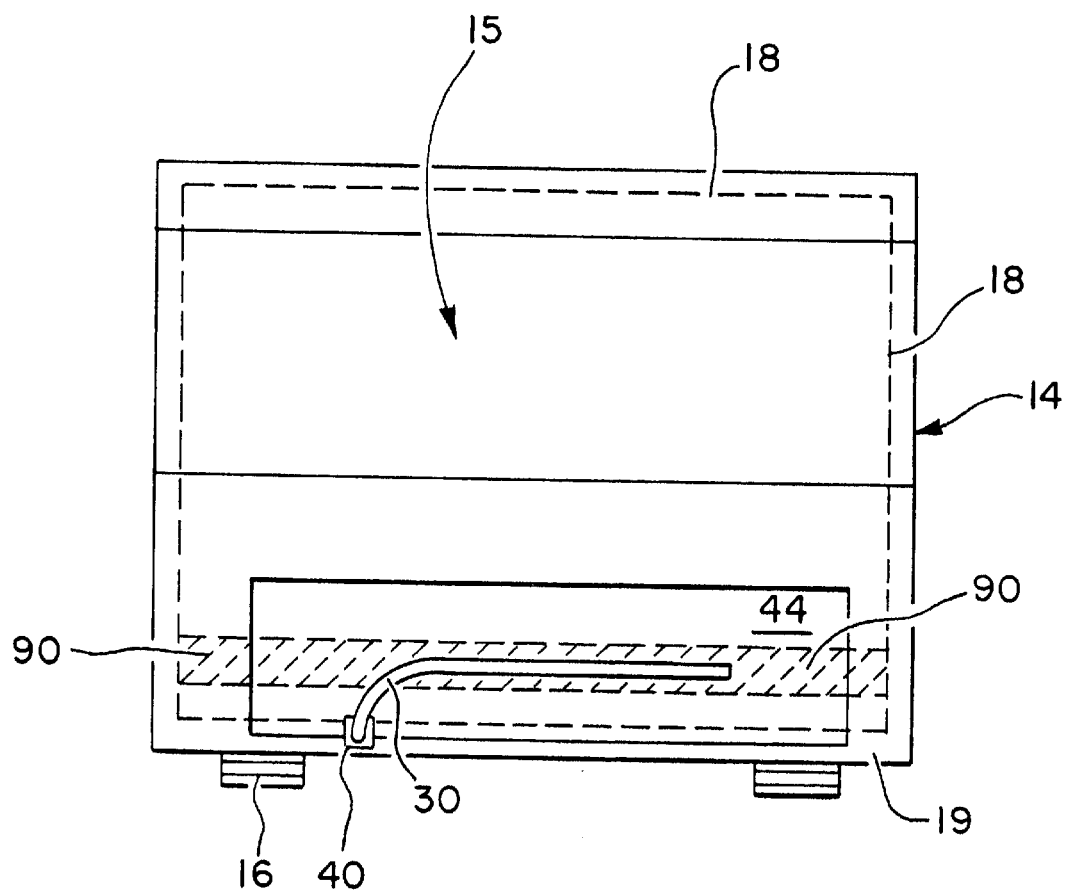
FIG. 8 is a plan back view of an alternative embodiment of a lid assembly according to the present invention.

Referring to FIG. 8, one particular aspect of the present invention involves the transfer of at least some heat from second heat pipe 30 to display 18. Display 18, preferably an LCD, typically has a cold-cathode fluorescent (CCF) backlight tube 90 which excites the fluorescent particles in display 18. By positioning second heat pipe 30 adjacent display 18, second heat pipe 30 transfers at least some heat to display 18, and more specifically, to CCF backlight tube 90. As a result, less electrical energy is needed to be transferred to CCF backlight tube 90 from the hinged computer's battery (not shown). Up to about 30 percent less electrical energy is needed to produce the same amount of light intensity when the LCD lamp temperature is increased by about 10 degrees Celsius. Since the LCD needs less electrical energy from the battery, the battery life can be increased.

It will be appreciated by those skilled in the art that, while described in conjunction with a portable computer, the heat dissipation systems of the present invention will be useful for a wide range of hinged computing devices. Heat dissipation systems of the present invention provide the benefits of heat pipe technology and heat sink technology to permit the dissipation of heat from heat-generating electronic components without the need to use a fan. The present invention further makes use of panel 19 as a large radiator surface to facilitate the dissipation of heat from the system.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A hinged computer, comprising:
   a base comprising a processor and a first heat pipe, said first heat pipe and said processor being thermally coupled;
   a lid assembly hingedly connected to said base, said lid assembly comprising a second heat pipe and a display;
   a thermally conductive joint, said joint having first and second receptacles, said first receptacle being generally parallel to and adjacent said second receptacle;
   wherein an end of said first heat pipe is positioned within said first receptacle and an end of said second heat pipe is positioned within said second receptacle to thermally couple said ends and said joint; and
   wherein at least a portion of said display is proximate said second heat pipe, said second heat pipe configured to transfer at least some heat from said processor to said display to facilitate operation of said display.

2. A hinged computer as in claim 1, wherein said base further comprises a heat spreader at least partially enclosing said processor, said heat spreader being operably attached to said first heat pipe and thermally coupled to said processor.

3. A hinged computer as in claim 2, wherein said heat spreader comprises an EMI shield.

4. A hinged computer as in claim 2, wherein said base further comprises a chassis, and wherein said heat spreader is thermally coupled and electrically grounded to said chassis.

5. A hinged computer as in claim 4, wherein said chassis comprises an electrical ground.

6. A hinged computer as in claim 1, wherein said first heat pipe comprises first and second portions, said first portion being generally round and at least partially disposed within said first receptacle, and said second portion being generally flat and thermally coupled to said processor.

7. A hinged computer as in claim 1, wherein said display comprises a liquid crystal display.

8. A hinged computer as in claim 1, wherein said lid assembly comprises a thermally conductive panel.

9. A hinged computer as in claim 8, wherein said second heat pipe comprises first and second portions, said first portion being generally round and at least partially disposed within said second receptacle, and said second portion being generally flat and thermally coupled to said panel.

10. A hinged computer as in claim 8, wherein said panel comprises an aluminum-magnesium alloy panel.

11. A hinged computer as in claim 8, wherein said panel further comprises a plurality of panel radiator fins.

12. A hinged computer as in claim 8, wherein said panel is integrally formed with at least a portion of said joint.

13. A hinged computer as in claim 1, wherein said base further comprises a thermally conductive chassis.

14. A hinged computer as in claim 13, wherein said joint is operably attached to said chassis.

15. A hinged computer as in claim 13, wherein said chassis comprises a metal.

16. A hinged computer as in claim 15, wherein said chassis comprises an aluminum-magnesium alloy.

17. A hinged computer as in claim 13, wherein said chassis further comprises a plurality of chassis radiator fins.

18. A hinged computer as in claim 13, wherein said chassis is integrally formed with at least a portion of said joint.

19. A hinged computer as in claim 1, wherein said joint comprises copper.

20. A hinged computer as in claim 1, wherein said joint comprises first and second portions connected to each other, said first portion comprising said first receptacle and said second portion comprising said second receptacle.

21. A hinged computer as in claim 1, wherein said lid assembly further comprises a third heat pipe having an end at least partially disposed within said second receptacle.

22. A hinged computer as in claim 1, wherein said base and said lid assembly are hingedly connected along a hinge axis, and wherein a portion of said second heat pipe is aligned with said hinge axis.

23. A hinged computer as in claim 22, wherein an end of said second heat pipe is adapted to rotate within said joint when said lid assembly and said base are rotated relative to each other about said hinge axis.

24. A hinged computer as in claim 1, wherein said base and said lid assembly are hingedly connected along a hinge axis, and wherein a portion of said first heat pipe is aligned with said hinge axis.

25. A hinged computer as in claim 24, wherein an end of said first heat pipe is adapted to rotate within said joint when said lid and said base are rotated relative to each other about said hinge axis.

26. The hinged computer as in claim 1 wherein said second heat pipe and display are positioned such that said second heat pipe provides sufficient heat to said display to reduce by about thirty (30) percent said amount of energy otherwise needed by said display from a computer battery.

27. The hinged computer as in claim 1 wherein said display further comprises a CCF backlight tube, said second heat pipe positioned to transfer at least some heat to said backlight tube.

28. The hinged computer as in claim 1 wherein said at least some heat is about 10 degrees Celsius.

29. A hinged computer, comprising:
   a base comprising,
      a heat-producing electronic component;
      a thermally conductive chassis, said chassis being integrally formed with a first joint portion;

a heat spreader thermally coupled with said electronic component and at least partially enclosing said electronic component; and a first heat pipe operably attached to said heat spreader and thermally coupled with said electronic component, said first heat pipe having an end that is thermally coupled with said first joint portion; and a lid assembly hingedly connected to said base forming a hinge axis, said lid assembly comprising, a thermally conductive panel, said panel being integrally formed with a second joint portion;

a liquid crystal display; and a second heat pipe thermally coupled with said panel, said second heat pipe having an end that is thermally coupled with said second joint portion, and at least a portion of said second heat pipe being thermally coupled to a portion of said display;

wherein said first and said second joint portions are operably attached to one another to thermally couple said first and said second heat pipes; and wherein said second heat pipe and display are positioned such that said second heat pipe provides sufficient heat to said display to reduce by about thirty (30) percent said amount of energy otherwise needed by said display from a computer battery.

30. A hinged computer, comprising:

a base comprising, a heat-producing electronic component;

a thermally conductive chassis, said chassis being integrally formed with a first joint portion;

a heat spreader thermally coupled with said electronic component and at least partially enclosing said electronic component; and a first heat pipe operably attached to said heat spreader and thermally coupled with said electronic component, said first heat pipe having an end that is thermally coupled with said first joint portion; and a lid assembly hingedly connected to said base forming a hinge axis, said lid assembly comprising, a thermally conductive panel, said panel being integrally formed with a second joint portion;

a liquid crystal display; and a second heat pipe thermally coupled with said panel, said second heat pipe having an end that is thermally coupled with said second joint portion, and at least a portion of said second heat pipe being thermally coupled to a portion of said display;

wherein said first and said second joint portions are operably attached to one another to thermally couple said first and said second heat pipes; and wherein said display further comprises a CCF backlight tube, said second heat pipe positioned to transfer at least some heat to said backlight tube.

31. A hinged computer, comprising:

a base comprising, a heat-producing electronic component;

a thermally conductive chassis, said chassis being integrally formed with a first joint portion;

a heat spreader thermally coupled with said electronic component and at least partially enclosing said electronic component; and a first heat pipe operably attached to said heat spreader and thermally coupled with said electronic component, said first heat pipe having an end that is thermally coupled with said first joint portion; and a lid assembly hingedly connected to said base forming a hinge axis, said lid assembly comprising, a thermally conductive panel, said panel being integrally formed with a second joint portion;

a liquid crystal display; and a second heat pipe thermally coupled with said panel, said second heat pipe having an end that is thermally coupled with said second joint portion, and at least a portion of said second heat pipe being thermally coupled to a portion of said display;

wherein said first and said second joint portions are operably attached to one another to thermally couple said first and said second heat pipes; and wherein said second heat pipe is adapted to raise a temperature of said portion of said display by about 10 degrees Celsius.

* * * * *